United States Patent [19]

Fork et al.

[11] 4,323,723
[45] Apr. 6, 1982

[54] SURFACE MOUNTED OUTLET UNIT

[75] Inventors: Frank W. Fork, Allison Park; Charles J. Kelly, Pittsburgh, both of Pa.

[73] Assignee: H. H. Robertson Company, Pittsburgh, Pa.

[21] Appl. No.: 137,545

[22] Filed: Apr. 4, 1980

[51] Int. Cl.³ ............................................. H02G 3/10
[52] U.S. Cl. ................................. 174/48; 220/3.94; 220/22
[58] Field of Search ...................... 174/48, 49; 52/221; 220/3.92, 3.94, 4 R, 22

[56] References Cited

U.S. PATENT DOCUMENTS

| Re. 27,549 | 1/1973 | Flachbarth et al. | 174/49 |
| 2,420,184 | 5/1947 | Mekelburg | 220/3.94 |
| 2,887,525 | 5/1959 | Lewus | 220/3.94 X |
| 3,047,650 | 7/1962 | Reiland | 174/49 |
| 3,335,214 | 8/1967 | Brotherhood | 174/48 |
| 3,417,191 | 12/1968 | Fork | 174/49 |
| 3,597,523 | 8/1971 | Guritz | 174/48 |
| 3,721,762 | 3/1973 | Gooding | 174/48 |
| 3,728,470 | 4/1973 | Maier | 220/3.92 X |
| 3,751,576 | 8/1973 | Klinkman et al. | 174/48 |

Primary Examiner—B. A. Reynolds
Assistant Examiner—D. A. Tone
Attorney, Agent, or Firm—George E. Manias

[57] ABSTRACT

A dual service outlet unit provides above-the-surface accessibility to power and to telephone and signal services. The unit includes cover and base members comprising segments of separate metal extrusions. When interfitted, the cover and base members provide separate compartments, one for power wiring and the other for telephone/signal wiring.

11 Claims, 6 Drawing Figures

SURFACE MOUNTED OUTLET UNIT

BACKGROUND OF THE INVENTION

1. Field of the Invention

This invention relates to an improved electrical outlet unit for use in connection with underfloor wiring systems for buildings; and more particularly to an improved outlet unit of the surface mounted type providing access to power and communications wiring.

2. Description of the Prior Art

The floors of modern buildings incorporate underfloor metal conduits or raceways for distributing wiring of different services, such as, high voltage power wiring and low voltage communications wiring. The power wiring and the communications wiring are housed in separate conduits.

Access to either wiring type has been provided by separate surface mounted outlet units such as disclosed for example in U.S. Pat. Nos. 3,047,650 (REILAND); 3,335,214 (BROTHERHOOD); and 3,597,523 (GURITZ).

Access to power and communications wiring has been provided in a single outlet unit such as disclosed for example in U.S. Pat. Nos. 3,417,191 (FORK) and 3,751,576 (KLINKMAN et al).

The outlets of REILAND, GURITZ, FORK and KLINKMAN et al consist of a multiplicity of components which reinstates the use of various fastening means to secure the parts together. The outlet units are relatively expensive to manufacture, and require a considerable length of time to assemble the parts for shipment, and to disassemble and reassemble the parts during installation in a building floor.

The outlet unit of BROTHERHOOD provides access to a single service. The cover and base members are extruded elements, whereby advantage is taken of the economies provided by extrusion techniques.

The principal object of this invention is to provide an improved floor-mounted outlet unit providing segregated compartments offering above-the floor access to different electrical services.

Another object of this invention is to provide a floor-mounted outlet unit having two principal components which comprise segments of different metal extrusions, thereby taking advantage of the economies offered by conventional extrusion techniques.

Broadly an improved outlet unit is provided composed of two principal interfitting components, that is, a base member and a cover member. In accordance with this invention, the base member comprises a segment of a first metal extrusion having a U-shaped profile and includes a bottom wall, upstanding opposite end walls, and an upstanding partition intermediate of the end walls. The cover member comprises a segment of a second metal extrusion having an inverted U-shaped profile and includes a top wall and depending opposite sidewalls. When assembled, the cover member straddles the base member such that the opposite sidewalls thereof confront opposite end edges of the end walls and the bottom wall of the base member. The cover member cooperates with the partition to define segregated compartments in which electrical connections can be made. Means is provided for securing the cover member to the base member.

Further in accordance with this invention, inlet openings are provided in the bottom wall, at least one in each of the compartments, for admitting power and communications wiring into the compartments. Outlet openings are provided, at least one in each of the end walls of the base member. The opening or openings in one end wall may accommodate the projecting face portions of special or conventional receptacles. The outlet opening or openings provided in the other end wall may accommodate suitable bushings or grommets through which multiple conductor cables, such as telephone cables, extend out of the unit.

BRIEF DESCRIPTION OF THE DRAWINGS

FIG. 6 is a fragmentary isometric view illustrating an alternative receptacle support arrangement.

DESCRIPTION OF THE PREFERRED EMBODIMENT(S)

Figure 1:
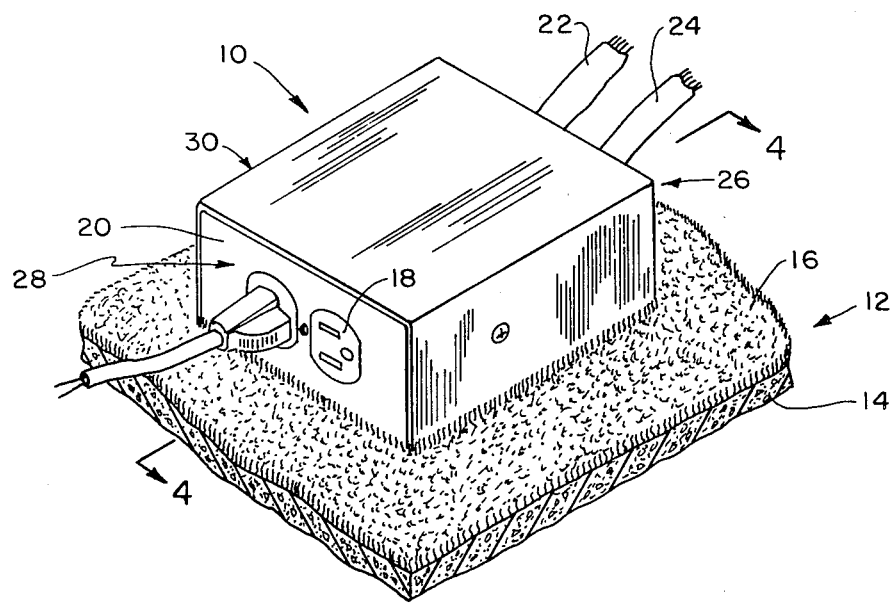
FIG. 1 is a fragmentary isometric view illustrating the present outlet unit installed in a building floor.

FIG. 1 illustrates an above-the-floor dual service outlet unit 10 of this invention. The unit 10 is mounted on the upper surface of a floor 12 of which only a fragment of a layer of concrete 14 and of a decorative covering, such as a carpet 16, are shown. The unit 10 offers—at one location in the floor 12—accessibility to electrical power by way of a duplex receptacle 18 presented at one end face 20 for plug connections; and accessibility to telephone and signal services, by way of telephone and signal cables 22, 24, respectively, which extend from the opposite end face 26.

Figure 2:
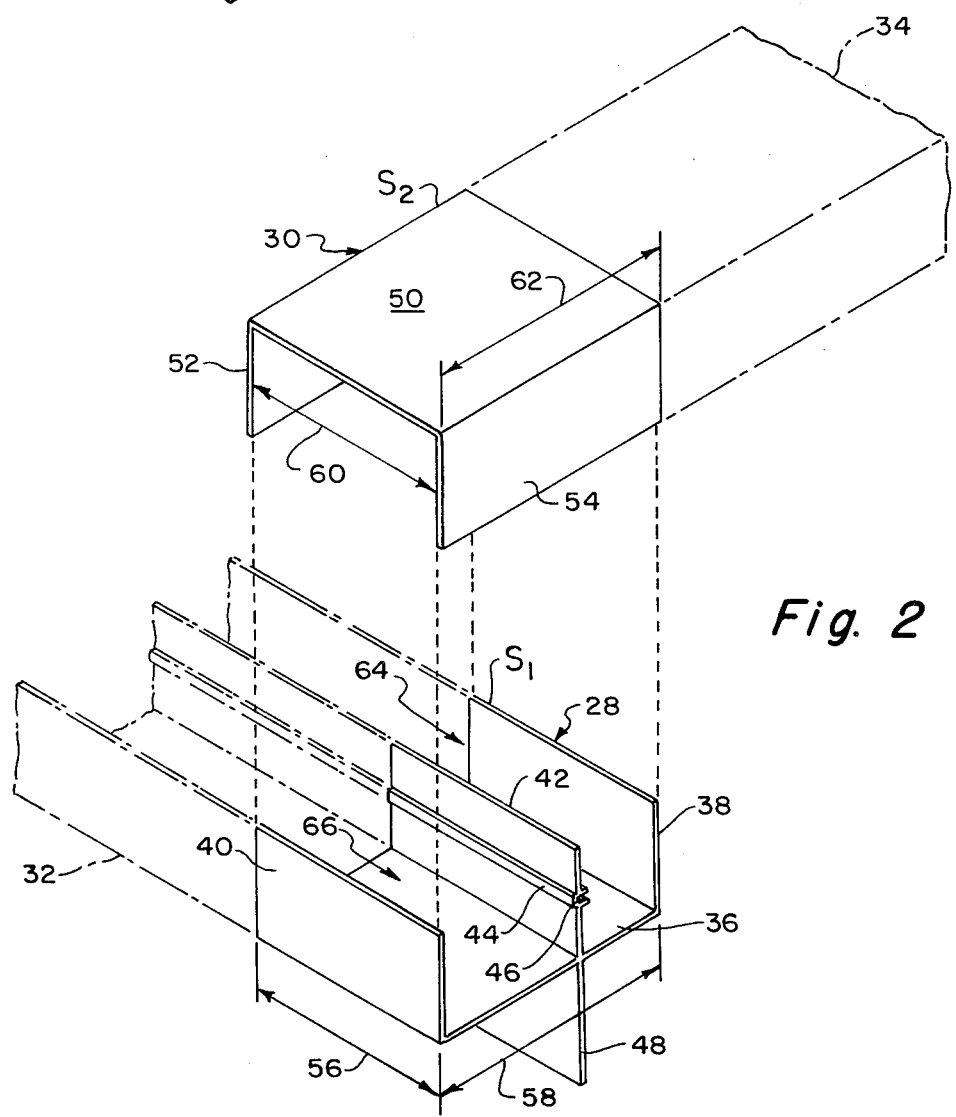
FIG. 2 is an isometric view of two metal extrusions, segments of which constitute the cover and base member of the present outlet unit.

As will become apparent, the unit 10 (FIG. 1) is assembled from base and cover members 28, 30. In accordance with this invention and as illustrated in FIG. 2, the base and cover members 28, 30 comprise segments $S_1$ and $S_2$ of first and second metal extrusions 32, 34, respectively. For the purpose of this description, the segments $S_1$, $S_2$ are illustrated in full lines whereas the remaining length of the metal extrusions 32, 34 are shown in dash-dot outline.

The first extrusion 32 has a generally U-shaped profile providing the base member 28 with a bottom wall 36, upstanding opposite end walls 38, 40, and an upstanding partition 42 intermediate of the end walls 38, 40. The partition 42 cooperates with the end walls 38, 40 and with the bottom wall 36 to define separate U-shaped channels 64, 66. The partition 42 has a rib 44 formed integrally therewith substantially parallel with the bottom wall 36. The rib 44 is provided with an axially extending groove 46 formed therein during the extrusion process. As will become apparent, the opposite ends of the groove 46 receive fasteners which secure the cover member 30 to the base member 28.

In certain installations, partitioning of a cavity disposed beneath the base 36 is required. For that situation, a depending flange 48 is provided serving as one member of a two member partition. The flange 48 is conveniently formed integrally with the bottom wall 36 and preferably is aligned with the partition 42.

The second metal extrusion 34 has a generally inverted U-shaped profile providing the cover member 30 with a top wall 50 and depending opposite sidewalls 52, 54.

It will be observed in FIG. 2 that the length 56 of the base member 28 corresponds substantially with the interior width 60 of the cover member 30; and that the length 62 of the cover member 30 is at least equal to and preferably slightly greater than the width 58 of the base member 28. The arrangement is such that the cover member 30 is adapted to straddle the base member 28 such that the opposite sidewalls 52, 54 thereof confront opposite end edges of the opposite end walls 38, 40 and of the bottom wall 36. After assembly, the cover member caps the U-shaped channels 64, 66 and converts the same into segregated compartments later to be identified.

The segments $S_1$ and $S_2$ which are cut from the extrusions 32, 34, undergo fabricating steps to adapt the same for use as the base and cover members 28, 30. The fabrication steps provide various openings now to be described in connection with FIG. 3.

A countersunk opening 64 is provided in each of the sidewalls 52, 54. The openings 64 are located so as to be axially aligned with the opposite ends of the groove 46 when the base and cover members 28, 30 are assembled. Each opening 64 receives a fastener 66 (only one illustrated in FIG. 3) which secures the cover 30 to the base 28.

Spaced-apart apertures 68 and a screw-receiving opening 70 intermediate thereof are provided in the end wall 38. The opening 68 and the aperture 70 adapt the end wall 38 to receive and retain the duplex receptacle 18 (FIG. 1). An inlet opening 72 is provided in that portion of the bottom wall 36 presented within the U-shaped channel 64. The inlet opening 72 allows passage of power wiring into the channel 64 for connection to the duplex receptacle 18.

Figure 3:
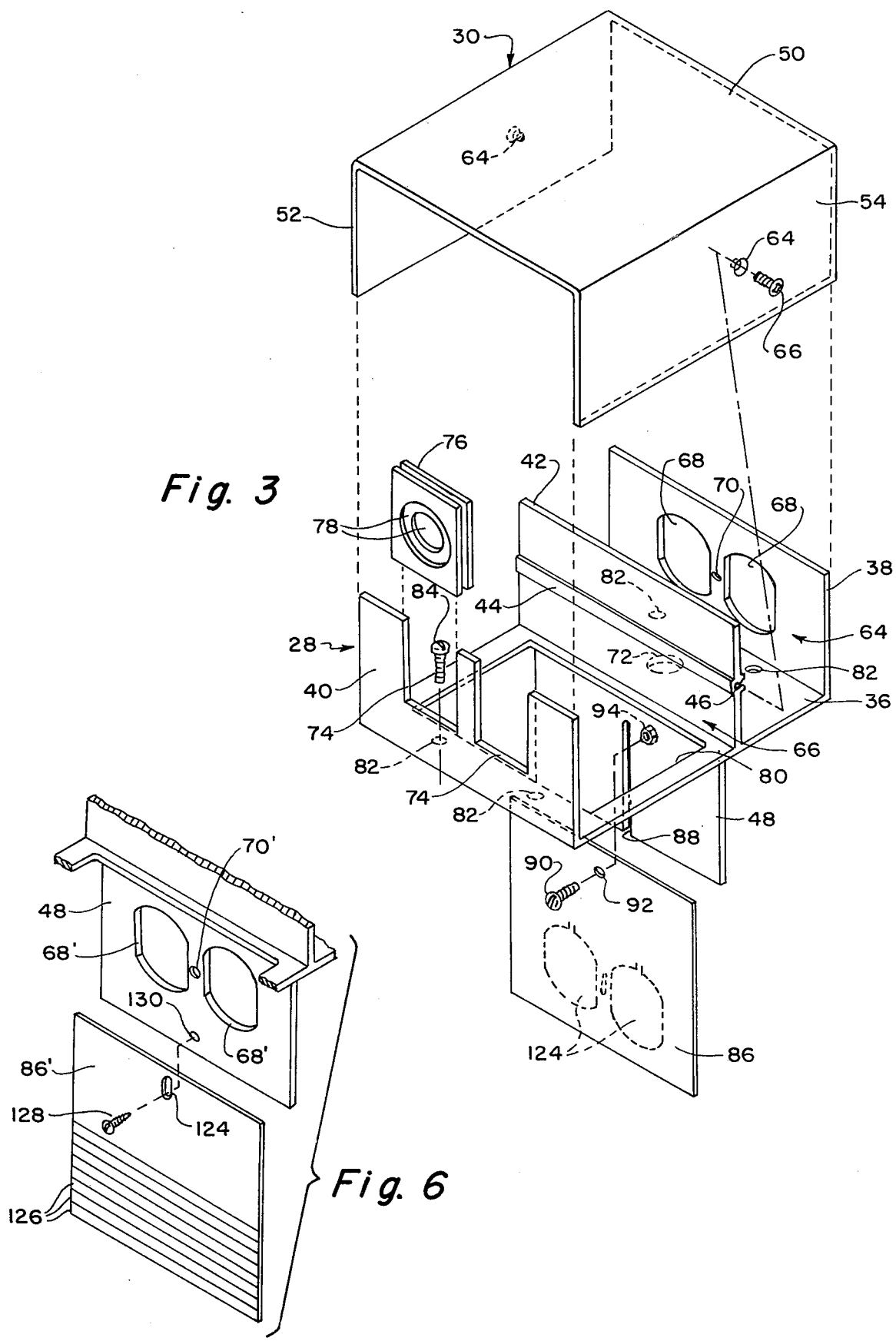
FIG. 3 is an isometric exploded view of the present outlet unit illustrating the components thereof.

The end wall 40 is provided with at least and preferably two notches 74 adapted to receive grommets 76 (only one illustrated in FIG. 3). The grommets 76 may present concentric weakened areas 78 certain of which are cut away to allow passage of telephone or signal cables. An inlet opening 80 is provided in that portion of the bottom wall 36 presented within the U-shaped channel 66. The inlet opening 80 allows passage of telephone and signal cables from the space below the base member 28 into the U-shaped channel 66.

Fastening means also are provided for securing the base member 28 to a substructure. In the FIG. 3 embodiment, the fastening means comprises two sets of spaced-apart screw-receiving openings 82, provided in the bottom wall 36, one set adjacent to each of the end walls 38, 40. The openings 82 are adapted to receive fasteners 84 (only one illustrated in FIG. 3) which are engageable with a substructure.

The width of the flange 48, measured in a direction parallel with the partition 42, may be adjusted to correspond with an opening in a supporting substructure. As can be seen in FIG. 3, the width adjustment may be made by cutting away opposite end portions of the flange 48. A partition flange 86 having an opening 92 is provided which cooperates with the flange 48 to provide full-height partitioning of a subjacent cavity. Fastening means, such as cooperating fastener 90 and nut 94, is provided for positively securing the partition flange 86 in vertically adjusted relation with respect to the flange 48.

Figure 4:
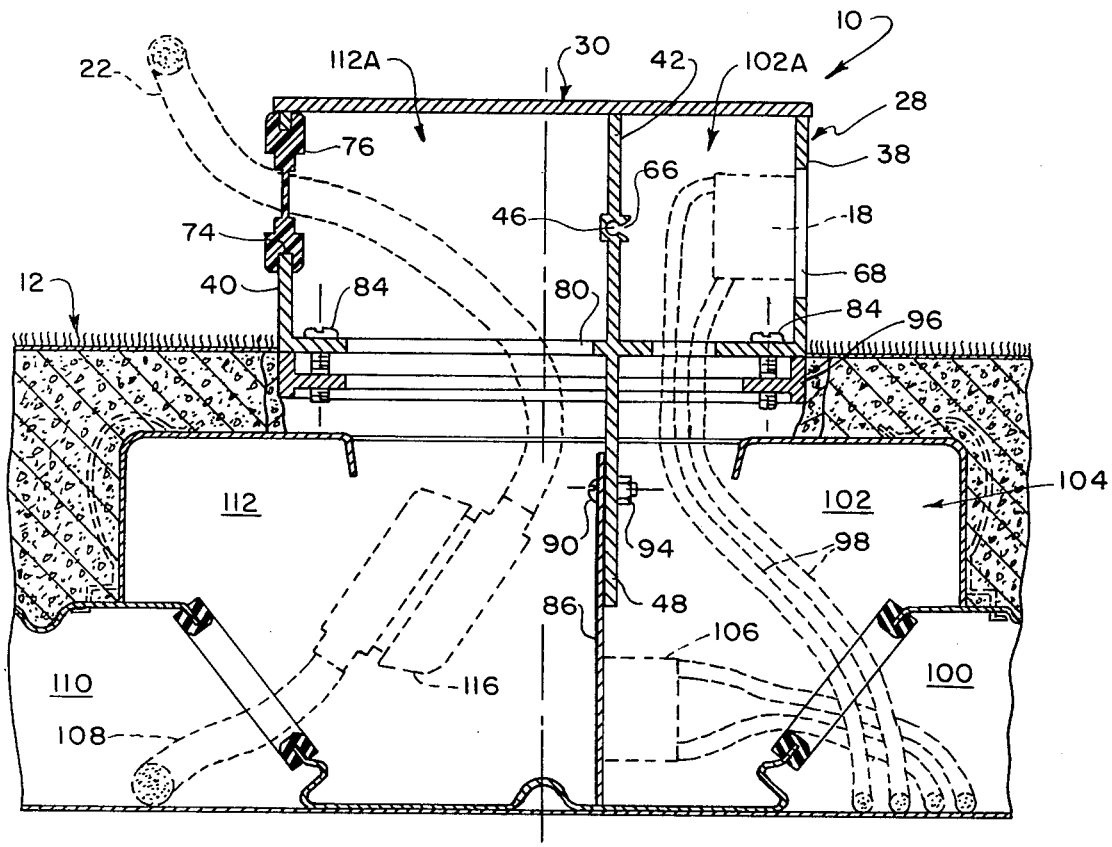
FIG. 4 is a cross-sectional view, taken along the line 4—4 of FIG. 1.

FIG. 4 illustrates the outlet unit 10 installed on the floor 12. The base member 28 is secured to an activating ring 96 by means of the fasteners 84. Power wiring 98 extends from a raceway 100 into a power compartment 102 of an underfloor cavity 104 through the outlet opening 72 and is connected to the duplex receptacle 18. The receptacle 18 is secured to the end wall 38 with the outlets thereof presented in the openings 68. A telephone cable 108 extends from a second raceway 110 into a telephone/signal compartment 112 of the underfloor cavity 104. A cable extension 22, connected to the telephone cable 108 by an amphenol connector 116, extends from the compartment 112 upwardly through the opening 80 and then outwardly of the unit 10 through an opening (not illustrated) in the grommet 76.

It will be observed in FIG. 4 that the flange 48 and the partition flange 86 divide the underfloor cavity 104 into the power compartment 102 and the telephone/signal compartment 112. The upstanding flange 42 of the base member 28 divides the interior of the unit 10 into a power compartment 102A and a telephone/signal compartment 112A. The arrangement is such that the power wiring 98 is completely segregated from the telephone/signal wiring 108.

Figure 5:
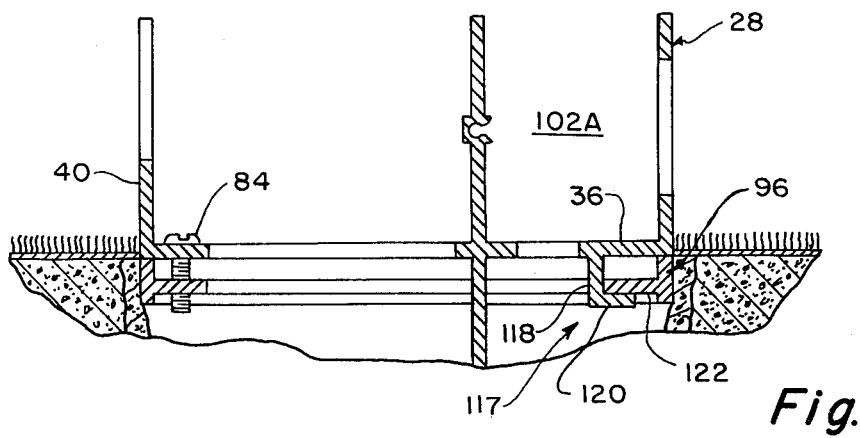
FIG. 5 is a fragmentary cross-sectional view, similar to FIG. 4, illustrating alternative means for securing the base member to the substructure.

Alternative fastening means 117 (FIG. 5) may be provided for securing the base member 28 to the activating ring 96. The fastening means 117 comprises an L-shaped flange 118 formed integrally with the bottom wall 36 at a lower face thereof. The L-shaped flange 118 includes a terminal portion 120 which is substantially parallel with the bottom wall 36 and which is engaged in hooked relation with a lower face 122 of the activating ring 96. The opposite end of the base member 28 is secured to the activating ring by the fasteners 84. The fastening means 117 may replace that set of the openings 82 and fasteners 84 situated next to either of the end walls 38, 40. The position of the fastening means 117 shown in FIG. 5 is preferred since it avoids the introduction of screw fasteners which may be longer than necessary into the high tension power compartment 102.

The outlet fitting 10 may include a second receptacle offering semi-permanent type electrical connections to equipment which normally remains in a fixed position. The second receptacle, shown in dotted outline at 106 in FIG. 4, may be mounted on the partition flange 86 after removing the knockouts 124 (FIG. 3). The second receptacle 106 is accessible through the telephone/signal compartments 112, 112A after removing the cover 30. The electrical cord (not illustrated) which is connected to the receptacle 106 may conveniently and neatly pass through a second grommet 76.

An alternative arrangement for supporting the second receptacle 106 is illustrated in FIG. 6. Openings 68', 70' are provided in the flange 48 for receiving and supporting the receptacle 106 (not shown). Vertical adjustment of the partition flange 86' relative to the flange 48 is provided for by a central slot 124 and a series of break-off strips 126. The partition flange 86' is secured to the flange 48 by a fastener 128 which will pass through the slot 124 and into a threaded opening 130 in the flange 48. The central slot 124 allows slight vertical movement of the flange 86' relative to the flange 48. The height of the partition flange 86' is adjusted to match that of the cavity 104, by removing one or more of the strips 126.

We claim:
1. A dual service outlet unit comprising;

a base member comprising a segment of a first metal extrusion having a generally U-shaped profile, said base member including a bottom wall, and formed integrally therewith upstanding opposite end walls and an upstanding partition intermediate of said end walls;

a cover member comprising a segment of a second metal extrusion having an inverted generally U-shaped profile, said cover member including a top wall and depending opposite sidewalls;

said cover member straddling said base member with said opposite sidewalls thereof confronting opposite end edges of said end walls and said bottom wall, and said partition extending from said bottom wall to said top wall thereby to define segregated compartments; and securing means securing said cover member to said base member.

2. The outlet unit as defined in claim 1 including
inlet openings in said bottom wall, at least one in each of said compartments;
outlet openings, at least one in each of said end walls.

3. The outlet unit as defined in claim 1 or 2 wherein said securing means includes
a rib formed integrally with said partition parallel with said bottom wall, said rib having an axial groove;
screw-receiving apertures, one in each of said sidewalls; and
screws extending through said apertures and threadedly engaged with said axial groove.

4. The outlet unit as defined in claim 1 or 2 including second means adapting said base for securement to a subjacent structure.

5. The outlet unit as defined in claim 4 wherein said second means comprises
screw-receiving openings in said bottom wall; and
hold-down screws extending through said opening and engageable with said subjacent supporting structure.

6. The outlet unit as defined in claim 4 including
inlet openings in said bottom wall, at least one in each of said compartments;
outlet openings, at least one in each of said end walls.

7. The outlet unit as defined in claim 1 wherein said cover member is secured to said partition.

8. An outlet unit comprising:
a base member comprising a segment of a first metal extrusion having a generally U-shaped profile, said base member including a bottom wall, upstanding opposite end walls, and an upstanding partition intermediate of said end walls;

a cover member comprising a segment of a second metal extrusion having an inverted generally U-shaped profile, said cover member including a top wall and depending opposite sidewalls;

said cover member straddling said base member with said opposite sidewalls thereof confronting opposite end edges of said end walls and said bottom wall, and cooperating with said partition to define segregated compartments;

securing means securing said cover member to said base member; and a flange formed integrally with said bottom wall and extending downwardly therefrom.

9. The outlet unit as defined in claim 8 wherein said flange is aligned with and comprises an extension of said upstanding partition.

10. The outlet unit as defined in claim 8 including
inlet openings in said bottom wall, at least one in each of said compartments;
outlet openings, at least one in each of said end walls.

11. An outlet unit comprising:
a base member comprising a segment of a first metal extrusion having a generally U-shaped profile, said base member including a bottom wall, upstanding opposite end walls, and an upstanding partition intermediate of said end walls;

a cover member comprising a segment of a second metal extrusion having an inverted generally U-shaped profile, said cover member including a top wall and depending opposite sidewalls;

said cover member straddling said base member with said opposite sidewalls thereof confronting opposite end edges of said end walls and said bottom wall, and cooperating with said partition to define segregated compartments;

securing means securing said cover member to said base member; and second means adapting said base for securement to a subjacent structure, said second means comprising:
an L-shaped flange formed integrally with said bottom wall at the lower face thereof and adjacent to one of said end walls, said L-shaped flange including a terminal portion substantially parallel with said bottom wall and engageable in hooked relation with said subjacent supporting structure;
screw-receiving openings in said bottom wall adjacent to the other of said end walls; and
hold-down screws extending through said openings and engageable with said subjacent supporting structure.

* * * * *